Patented May 28, 1940

2,202,566

UNITED STATES PATENT OFFICE 2,202,566

TAMPONS AND OTHER POROUS ARTICLES AND PROCESS FOR PRODUCING SAME

Wilhelm Schulte, Meppel, Netherlands, assignor to N. V. Koninklijke Pharmaceutische Fabrieken v/h Brocades-Stheeman & Pharmacia, Meppel, Netherlands, a limited-liability company of the Netherlands No Drawing. Application February 2, 1937, Serial No. 123,727. In the Netherlands February 7, 1936

8 Claims. (Cl. 18—54)

This invention relates to tampons and other porous articles, such as sheaths and bandages, and to a process for producing same.

In medical practice a need exists for resorbable tampons. When charged with the desired medicative agent, these tampons—provided they fulfil all the other requirements of the medical profession—are applied to, or adjacent to, the affected part of the body. In that position, they can give off the medicative agent in small quantities over a long period, and be then resorbed by the body. Such a method of treatment is naturally able to furnish substantial advantages over the employment of medicative agents, or the like, in larger quantities, for example by injections—per os, rectal and so forth—apart from the consideration that the agents applied in the last-named manner do not always reach the affected part.

As already indicated, the fact that a tampon is capable of resorption is no criterion of its actual utility, and it must fulfil further substantial requirements, the following in particular:

1. Complete sterility must be assured in all circumstances.
2. The tampon must be very light and, at the same time, bulky, in order to minimise the amount of substances, foreign to the human body—such as dissimilar protein reaching the wound.
3. The tampon must be able to take up the medicative agent in sufficient quantities.
4. The transmission of the medicative agent must be gradual.
5. The tampon must be resorbed, not only in a complete manner, but also without producing any harmful reaction.

Tampons fulfilling all these requirements are unknown. Although it has already been proposed to make tampons by shredding certain animal membranes, these tampons have not made any great headway in practice. Inter alia, one defect of such tampons is that, by reason of the originating material, they can never guarantee absolute freedom from pathogenic micro-organisms and moreover, they are incapable of absorbing a sufficient quantity of certain medicative agents.

It is the aim of the present invention to provide tampons which fulfil all requirements. To this end, in accordance with the present invention, animal material—such as sinew or skin—containing elastin and/or collagenous fibres, is employed, which after being freed from undesirable constituents, is allowed to swell by steeping in a suitable medium, the swollen mass being teased out, subjected to the action of a shrinking medium, then freed from surplus water and worked up into the desired product.

Numerous experiments have shown that tampons produced in this manner meet all medical requirements. However, it should also be borne in mind that the tampon must display a certain character, according to the medicative agent it is to absorb. Though, in any event, the mass must be more or less porous, its absorbent capacity must be different for a liquid than for a solid agent such as a radium preparation: a tampon with a spongy texture being preferred in the former case. Experiments have established that by employing the above mentioned process, tampons adapted to suit widely differing requirements can be produced.

The swelling and shrinking of animal materials containing elastin and/or collagenous fibres, has been described, in another connection, in my U. S. Patent No. 2,039,262. In the case of the present invention, as in that case, the swelling agents preferably consist of dilute solutions of acids, or other substances with an acid reaction, and, in the present invention also, substances with an alkaline reaction are preferably employed as the shrinking agent. Examples of swelling agents are: lactic acid, hydrochloric acid; of shrinking agents: ammonia, amines, sodium bicarbonate may for example be used.

The method of carrying out the process of the invention depends on the texture to be imparted to the tampon. In general, a spongy texture is preferred, and the invention is also specially directed to the production of this type. For this reason this method will be described in the first place, in application to several modifications.

After the originating material has been steeped, for example until it has swollen to the apparent state of a homogeneous mass, it is disintegrated into fibres, so that a fibrous suspension is obtained. A gas, such as air, or nitrogen or hydrogen, is introduced into this suspension, for example while the latter is being stirred. Alternatively, substances which liberate gas under the existing conditions, such as sodium bicarbonate when an acid-swelling medium is used or by the action of a shrinking agent, may be incorporated with the suspension. After the shrinking agent has acted, the surplus water is removed and the mass is dried.

It is not always essential to disintegrate the swollen mass in such a way, for example, as to set free the elementary fibres. The mass can also be comminuted, for example, treated in a grinder so that the fibrous structure is more or less completely broken down. The further procedure is the same as in the foregoing embodiment. Of course, in this case, the tensile strength of the resulting product is lower than in the other in which the fibrous texture of the originating material is retained; this, however, is often a matter of minor importance.

In these methods it is preferable to use a gaseous or vaporous shrinking agent, such as ammonia or an amine, and an inert gas, such as air, may be mixed with said agent. It is advisable to place the mass on a sieve during the treatment with the shrinking agent.

Although it has been stated in the foregoing that the gas is emulsified with the disintegrated or comminuted mass, this must not be interpreted as meaning that the gas can only be employed during this stage. The gas may also be generated or introduced during, or even before, the mechanical treatment of the swollen mass. A gaseous shrinking agent can also be mixed with an adequate quantity of gas, so that the separate introduction of the latter becomes superfluous, all that is needed being to see that a porous mass is present after the shrinking agent has performed its function.

The shrunk, spongy mass can be easily dried in that form. The degree of porosity, and accordingly the weight per unit volume, can be readily controlled by means of the quantity of gas distributed throughout the mass prior to shrinking, fineness of distribution naturally improving the homogeneity of the end product. The degree of porosity also affords a means of influencing the absorbent capacity and rate of resorption of the tampon.

The foregoing methods are, in general, the best. The products obtained are very light. They can also be perforated, if desired, and they absorb many times their own weight of liquid.

When less importance is attached to a decidedly spongy texture, the introduction of a gas into the swollen mass may be omitted, and it may be sufficient to disintegrate the swollen mass and then subject it to the action of a shrinking agent. The water thereby separated is removed, for example by centrifuging. The resulting mass is then dried and separated into a mass of loose fibres—for example in a carding machine—which are afterwards worked up into the desired end product.

When skin or sinew is taken as the originating material it is not even absolutely necessary that it should first be swollen. It may also be disintegrated while in the dry state, a loose mass of fibres being obtained which can be cut into pieces of the desired size.

The originating material may be selected from such as is already free from pathogenic microorganisms. In order, if necessary, to render harmless any micro-organisms that may have been taken up during the working stages, the final treatment is usually a sterilizing process. This can be performed with suitable chemicals, or by the dry method—after the elimination of moisture—in a hot gas, such as air. Although, in view of the material treated, this last method would seem open to objection, it is perfectly suitable and is generally preferred. Of course, sterilization need not immediately follow production, but may be performed later, for example by the user of the tampon.

However, sterilization may be performed at any convenient stage of the process, the further stages being conducted under antiseptic, or aseptic conditions.

The rate of resorption of the tampon can be controlled, and thus adapted to varying conditions, not only by the degree of porosity, but by treatment with chemical reagents accelerating or retarding its solubility.

The present invention is not restricted to tampons, but the process is also admirably adapted—on account of the nature and treatment of the originating material—for the production of other porous articles which perform similar functions, such as sheaths, suppositories and bandages. The first two of these articles are also for insertion into corporeal cavities, and bandages are often applied to superficial wounds. Consequently most of the requirements imposed on these products are of parallel character. In view of what has been stated in the foregoing, the method of production will manifestly be adapted to the purpose in view. Thus, a more spongy texture is often advisable for capsules, and a fibrous texture for bandages.

The products of the present invention can be charged with various medicative agents. To mention a few examples, the products can be rendered radioactive by charging them with radioactive compounds, or by irradiation with preparations of radium. Medicative agents, in the true sense, such as styptics, may also be used. Impregnation with an antiseptic, such as iodine, is often necessary and sufficient. The invention facilitates the use of these and similar agents in the widest sense, especially in the case of parts of the body that are difficult to reach and not always accessible.

What I claim is:

1. Porous products consisting at least partly of animal material containing aerated elastin or collagenous fibers and exhibiting a spongy texture.

2. Porous surgical products consisting at least partly of animal material containing elastin or collagenous fibers, said fibers having a gas included thereby, and exhibiting a spongy texture.

3. Porous surgical products consisting at least partly of animal material containing shrunken gas including elastin or collagenous fibers, charged with a therapeutically active medium and exhibiting a spongy texture.

4. A process for the production of porous products, which comprises swelling animal material containing elastin or collagenous fibers in a swelling medium, teasing out the swollen material, distributing a gas throughout said material, subjecting said material to the action of a shrinking agent for the swollen fibers, and freeing said material from surplus water and working it up into the desired form.

5. A process for the production of porous products, which comprises swelling animal material containing elastin or collagenous fibers in a swelling medium, teasing out the swollen material, distributing a gas throughout said material, subjecting said swollen material to the action of a gaseous shrinking agent for the swollen fibers, and working up the material into the desired form.

6. A process for the production of porous surgical products, which comprises swelling animal material containing elastin or collagenous fibers in a swelling medium, teasing out the swollen material, distributing a gas throughout said material, subjecting said swollen material to the action of a gaseous shrinking agent for the swollen fibers admixed with an inert gas, and working up the material into the desired form.

7. A process for the production of porous surgical products, which comprises swelling animal material containing elastin or collagenous fibers in a swelling medium, teasing out the swollen material, distributing a gas throughout said material, subjecting said swollen material to the action of a mixture of air and ammonia, and working up the material into the desired form.

8. A process for the production of porous surgical products, which comprises swelling animal material containing elastin or collagenous fibers in a swelling medium, teasing out the swollen material, distributing an inert gas throughout said material in controlled amounts depending on the porosity desired, subjecting said material to the action of a shrinking agent for the swollen fibers, and working it up into the desired form.

WILHELM SCHULTE.